United States Patent
Zhang et al.

(10) Patent No.: US 7,801,210 B2
(45) Date of Patent: Sep. 21, 2010

(54) APPARATUS AND METHODS FOR IMPLEMENTING A SPLIT EQUALIZER FILTER FOR SPARSE CHANNELS

(75) Inventors: Jianzhong Zhang, Irving, TX (US); Markku J. Heikkilä, Oulu (FI)

(73) Assignee: Nokia Corporation, Espoo (FI)

( * ) Notice: Subject to any disclaimer, the term of this patent is extended or adjusted under 35 U.S.C. 154(b) by 1168 days.

(21) Appl. No.: 11/339,093

(22) Filed: Jan. 24, 2006

(65) Prior Publication Data

US 2007/0171960 A1   Jul. 26, 2007

(51) Int. Cl.
  H03H 7/30    (2006.01)
  H03H 7/40    (2006.01)
  H03K 5/159   (2006.01)

(52) U.S. Cl. .................. 375/231; 375/147; 375/229; 375/232; 375/233

(58) Field of Classification Search .......... 375/229, 375/231, 232, 233, 147
See application file for complete search history.

(56) References Cited

U.S. PATENT DOCUMENTS

| | | | |
|---|---|---|---|
| 5,719,899 A * | 2/1998 | Thielecke et al. | 375/144 |
| 6,735,630 B1 * | 5/2004 | Gelvin et al. | 709/224 |
| 7,203,718 B1 * | 4/2007 | Fu et al. | 708/622 |
| 7,599,426 B2 * | 10/2009 | Despain | 375/152 |
| 2005/0063500 A1 | 3/2005 | Li et al. | 375/350 |
| 2007/0025434 A1 | 2/2007 | Sternberg et al. | 375/229 |

OTHER PUBLICATIONS

Gerlach, H. et al., "Constrained Chip-Level Kalman Filter Equalization for the UMTS-FDD Downlink", May 2004, 4 pages, World Wireless Congress (WWC), San Francisco, CA.
Papadimitriou, P. et al., "On Optimal Chip Equalization for Equal-Power Synchronous CDMA Systems", Mar. 17-19, 2004, pp. 1252-1255, Proceedings of the 38th Annual Conference on Information Sciences and Systems (CISS), Princeton University.
Klein, A., "Data Detection Algorithms Specially Designed for the Downlink of CDMA Mobile Radio Systems", 1997, pp. 203-207, Institute of Electrical and Electronics Engineers, Inc. (IEEE).

(Continued)

*Primary Examiner*—Ted M Wang
(74) *Attorney, Agent, or Firm*—Harrington & Smith

(57) ABSTRACT

The invention concerns methods and apparatus for performing channel equalization in a direct-sequence spread spectrum communications system. The methods and apparatus of the present invention are particularly applicable in situations where communication occurs over a channel experiencing multipath interference associated with paths having significantly different lengths. The impulse response-delay profile of such a channel is typically sparse, that is, dominated by a relatively few and widely spaced taps or clusters of closely spaced taps. In one aspect, equalization filter coefficients are calculated based on a channel estimate derived from a single cluster of closely-spaced channel taps collectively having the greatest percentage of energy as indicated by the impulse response-delay profile. In another aspect, equalization filter coefficients are calculated for each of two clusters of closely-spaced channel taps, where the two clusters of closely-spaced channel taps are separated by a delay spread indicative of a sparse channel. In a further aspect where channel equalization coefficients are calculated for each of two clusters of closely-spaced channel taps, the equalization coefficients are jointly optimized during the calculation process.

24 Claims, 7 Drawing Sheets

OTHER PUBLICATIONS

Ghauri, I. et al., "Linear Receivers for the DS-CDMA Downlink Exploiting Orthogonality of Spreading Sequences", 1998, pp. 650-654, Institute of Electrical and Electronics Engineers, Inc. (IEEE).

Werner, S. et al., "Downlink Channel Decorrelation in CDMA Systems With Long Codes", 1999, pp. 1614-1617, Institute of Electrical and Electronics Engineers, Inc. (IEEE).

Krauss, T. et al., "MMSE Equalization for Forward Link in 3G CDMA: Symbol-Level Versus Chip-Level", 2000, pp. 18-22, Institute of Electrical and Electronics Engineers, Inc. (IEEE).

Heikkila, M. et al., "Interference Suppression in CDMA Downlink through Adaptive Channel Equalization", VTC 1999, pp. 978-982, Institute of Electrical and Electronics Engineers, Inc. (IEEE).

Heikkila, M. et al., "A Novel Blind Adaptive Algorithm for Channel Equalization in WCDMA Downlink", 2001, pp. A-41-A-45, Institute of Electrical and Electronics Engineers, Inc. (IEEE).

Zhang, J. et al., "Efficient Linear Equalization for High Data Rate Downlink CDMA Signaling", 2003, pp. 141-145, Institute of Electrical and Electronics Engineers, Inc. (IEEE).

Nguyen, H. et al., "Equalization of CDMA Downlink Channel Via Kalman Filtering", 2003, pp. 1128-1132, Institute of Electrical and Electronics Engineers, Inc. (IEEE).

Rontogiannis A. et al., "Efficient Decision Feedback Equalization for Sparse Wireless Channels", May 2003, pp. 570-581, IEEE Transactions on Wireless Communications, vol. 2, No. 3.

Fevrier, I. et al., "Reduced Complexity Decision Feedback Equalization for Multipath Channels with Large Delay Spreads", Jun. 1999, pp. 927-937, IEEE Transactions on Communications, vol. 47, No. 6.

Jin, Y. et al., "On the Performance of Equalizers for Sparse Channels", 2000, pp. 1757-1761, Institute of Electrical and Electronics Engineers, Inc. (IEEE).

S. Chowdhury et al., "Structured MMSE Equalization for Synchronous CDMA With Sparse Multipath Channels", Proceedings IEEE International Conference on Acoustics, Speech, and Signal Processing, (ICASSP '01), 2001, vol. 4, Sec. 3-4.

M. K. Simon et al., "Digital Communication over Fading Channels (2nd Edition)", Hoboken, NJ, USA, John Wiley & Sons, Incorporated, 2005, pp. 317-318.

* cited by examiner

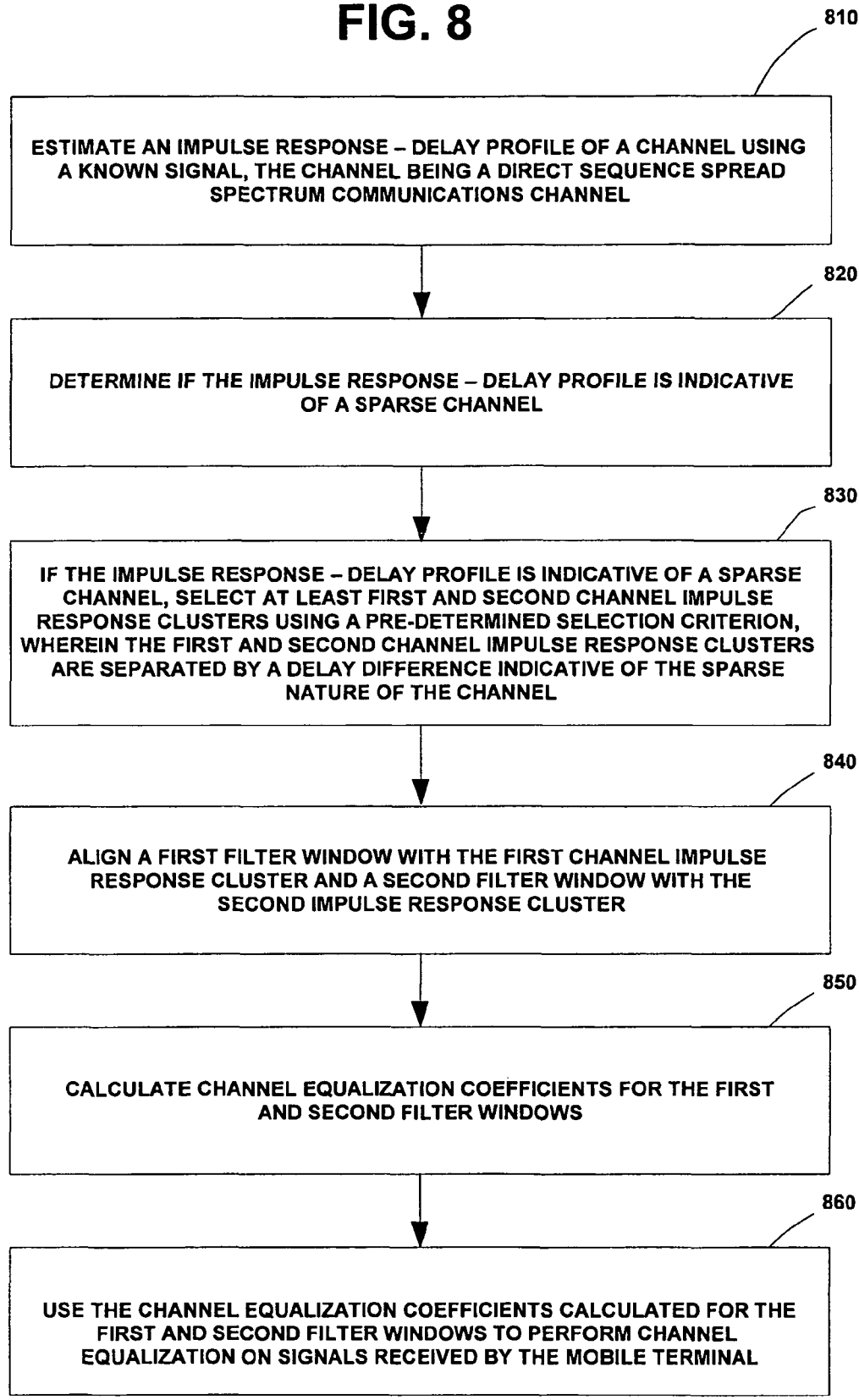

US 7,801,210 B2

APPARATUS AND METHODS FOR IMPLEMENTING A SPLIT EQUALIZER FILTER FOR SPARSE CHANNELS

TECHNICAL FIELD

The present invention generally concerns methods and apparatus for performing channel equalization in direct sequence spread spectrum communication systems and more particularly concerns methods and apparatus for performing chip-level channel equalization of direct sequence spread spectrum communication signals where the channel has a sparse impulse response profile.

BACKGROUND

Many current systems which are based on a CDMA air interface, such as WCDMA and CDMA2000, use a linear equalizer in order to improve link and system performance and to achieve very high data rates in packet and circuit-switched connections. Applying linear equalizers to voice channels is also under consideration. Currently, rake receivers are used for voice channels. The use of a linear equalizer for both voice and high-speed data connections would significantly reduce receiver complexity and is thus highly desirable.

A typical linear equalizer is a chip-sample-level finite impulse response ("FIR") filter, whose length is at least twice (preferably 2.5-3 times) the channel delay spread for adequate performance. The length requirement for adequate performance is particularly problematic wherever significant delay is expected. In conventional linear equalizer implementations, the greater the delay spread, the greater the linear equalizer complexity.

In the case of HSDPA, for example, 3GPP technical specifications require using an equalizer (or some other advanced receiver), which should be capable of handling a PedB channel. In addition to HSDPA or other packet switched data connections, it is possible to use a linear equalizer for voice channels (in WCDMA or CDMA2000). The performance requirements are even tighter in case of voice channels (from an equalization point of view) because the maximum delay spread to be supported can be very high. In WCDMA the requirement is 77 chips ("Case 2 channel"), which, in practice, leads to an impractical equalizer complexity.

In general, if voice channels are to be equalized, the equalizer has to be longer than the current HSPDA equalizer for robust performance in different environments. When the channel has a very long delay spread, it is probable that the channel is also sparse to a degree, i.e., the most significant channel taps are not spread evenly over the whole delay window but are concentrated inside a couple of sub-windows separated in a time domain. A conventional linear equalizer cannot utilize this sparse structure but always assumes that the channel has continuous impulse response. This can lead to unacceptable equalizer complexity.

An example of a sparse channel is the 77 chips long "Case 2" reference channel in 3GPP TS25.101 specification. Note that presented power-delay profiles are often averaged over some measurement period and thus follow some expected exponential decay curve. However, shorter averaging periods show that occasionally a large part of the energy comes through paths with very large propagation delay.

Accordingly, those skilled in the art desire methods and apparatus for performing linear equalization of channels having very long delay spreads that are significantly less complex than conventional linear equalizer implementations.

Those skilled in the art also desire methods and apparatus that capitalize on the relative simplicity of a channel having a relatively sparse impulse response-delay profile to significantly reduce the complexity of a linear equalizer used for performing equalization of the sparse channel.

In addition, those skilled in the art desire methods and apparatus for performing linear equalization more efficiently in comparison to conventional linear equalization methods that ignore signal components associated with large delays.

Further, those skilled in the art desire linear equalizers that accommodate large delay spreads often specified for voice channels and thus can be used both for high-speed data channels and for voice channels.

SUMMARY OF THE PREFERRED EMBODIMENTS

The foregoing and other problems are overcome, and other advantages are realized, in accordance with the following embodiments of the present invention.

A first embodiment of the invention comprises a signal processing component for use in a mobile terminal operable in a wireless telecommunications system, the signal processing component for performing channel equalization operations, the channel equalization operations comprising: estimating an impulse response-delay profile of a channel using a known signal, the channel being a direct sequence spread spectrum communications channel; determining if the impulse response-delay profile is indicative of a sparse channel; if the channel impulse response-delay profile is indicative of a sparse channel, selecting a first channel impulse response cluster using a pre-determined selection criterion, wherein the first channel impulse response cluster is separated from other channel impulse response clusters by a delay difference indicative of the sparse nature of the channel; aligning a first filter window with the first channel impulse response cluster; calculating channel equalization coefficients for the first filter window; and using the channel equalization coefficients to perform channel equalization on signals received by the mobile terminal.

A second embodiment of the invention comprises a mobile terminal for use in a wireless communication network, the mobile terminal comprising: a wireless section comprising a digital signal processor; a signal processing component for performing channel equalization operations; a wireless transceiver; and an antenna, wherein the signal processing component performs the following channel equalization operations: estimating an impulse response-delay profile of a channel using a known signal, the channel being a direct sequence spread spectrum communications channel; determining if the impulse response-delay profile is indicative of a sparse channel; if the channel impulse response-delay profile is indicative of a sparse channel, selecting at least a first channel impulse response cluster and a second channel impulse response cluster using a pre-determined selection criterion, wherein the first channel impulse response cluster and second channel impulse response clusters are separated by a delay difference indicative of the sparse nature of the channel; aligning a first filter window with the first channel impulse response cluster and a second filter window with the second impulse response cluster; calculating channel equalization coefficients for the first and second filter window; and using the channel equalization coefficients calculated for the first and second filter windows to perform channel equalization on signals received by the mobile terminal.

A third embodiment of the invention comprises a method for use in a mobile terminal for performing channel equalization operations, the method comprising: estimating an impulse response-delay profile of a channel using a known signal, the channel being a direct sequence spread spectrum communications channel; determining if the impulse response-delay profile is indicative of a sparse channel; if the channel impulse response-delay profile is indicative of a sparse channel, selecting at least a first channel impulse response cluster and a second channel impulse response cluster using a pre-determined selection criterion, wherein the first channel impulse response cluster and second channel impulse response clusters are separated by a delay difference indicative of the sparse nature of the channel; aligning a first filter window with the first channel impulse response cluster and a second filter window with the second impulse response cluster; calculating channel equalization coefficients for the first and second filter window; and using the channel equalization coefficients calculated for the first and second filter windows to perform channel equalization on signals received by the mobile terminal.

A fourth embodiment of the present invention comprises a mobile terminal for use in a wireless communication network, the mobile terminal comprising: memory means for storing an operating program for controlling the mobile terminal, where the operating program further comprises a computer program component for controlling operation of the mobile terminal; wireless section means comprising digital signal processing means; signal processing component means; wireless transceiver means and an antenna means for performing wireless communication operations; processing means coupled to the memory means and wireless section means for executing the operating program, wherein the signal processing component performs the following channel equalization operations: estimating an impulse response-delay profile of a channel using a known signal, the channel being a direct sequence spread spectrum communications channel; determining if the impulse response-delay profile is indicative of a sparse channel; if the channel impulse response-delay profile is indicative of a sparse channel, selecting at least a first channel impulse response cluster and a second channel impulse response cluster using a pre-determined selection criterion, wherein the first channel impulse response cluster and second channel impulse response clusters are separated by a delay difference indicative of the sparse nature of the channel; aligning a first filter window with the first channel impulse response cluster and a second filter window with the second impulse response cluster; calculating channel equalization coefficients for the first and second filter window; and using the channel equalization coefficients calculated for the first and second filter windows to perform channel equalization on signals received by the mobile terminal.

Thus, it is seen that embodiments of the present invention overcome the limitations of the prior art. Conventional linear equalization methods do not take into consideration the sparse impulse response-delay profile often associated with channels subject to large delay spreads. As a result, particular linear equalizer implementations are unduly complex and computation-intensive (particularly with respect to burdensome multiplication operations). In addition, due to the lack of efficient and less complex methods, linear equalizers often have not been used for particular applications (such as, for example, voice channel equalization).

In contrast, the foregoing embodiments of the present invention overcome the limitations of the prior art. In particular, methods and apparatus of the present invention take into consideration the relatively simple nature of channels having sparse impulse response-delay profiles. The methods and apparatus of the present invention only calculate equalization coefficients for channel taps having significant energy. Equalization coefficients are not calculated for channel taps have insubstantial or zero energy.

In addition, the relative simplicity and lack of complexity of methods and apparatus operating in accordance with the present invention mean that linear equalizers can be used in a wider range of applications such as, for example, in equalization of voice channels.

In conclusion, the foregoing summary of the embodiments of the present invention is exemplary and non-limiting. For example, one of ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 8 is a flow chart depicting another method operating in accordance with the present invention.

DETAILED DESCRIPTION OF THE PREFERRED EMBODIMENTS

The methods and apparatus of the present invention can be practiced in a portable communications device—such as, for example, a wireless cellular telephone—operable in a wireless communications system. Details associated with a wireless cellular telephone and a wireless communication system will be described first as background, followed by a description of the prior art and various embodiments of the invention.

Figure 1:
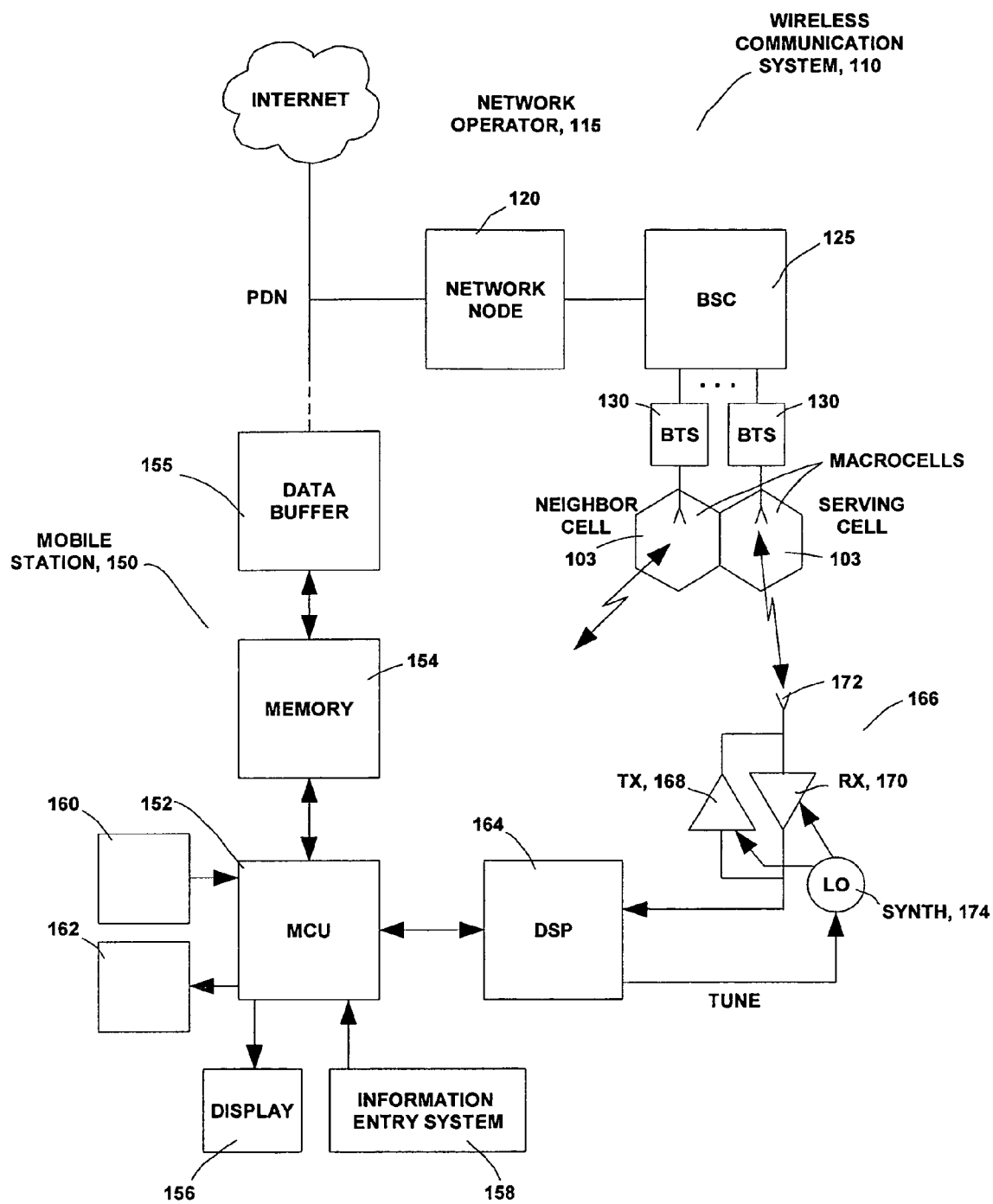
FIG. 1 depicts a wireless communication system in which the methods of the present invention can be practiced.

FIG. 1 depicts in simplified form a block diagram of a wireless communications system 110 in which a mobile terminal 150 operates. "Mobile terminal" as used herein generally encompasses any wireless device with voice and/or data communications capability. Also shown is an exemplary network operator 115 having, for example, a network node 120 for connecting to a telecommunications network, such as a Public Packet Data Network or PDN; at least one base station controller (BSC) 125 or equivalent apparatus; and a plurality of base transceiver stations (BTS) 130, also referred to as base stations (BSs), that transmit in a forward or downlink direction both physical and logical channels to the mobile terminal 150 in accordance with a predetermined air interface standard. A reverse or uplink communications path also exists from the mobile terminal 150 to the network operator 115, which conveys mobile-terminal-originated access requests and traffic. A cell 103 is associated with each BTS 130, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data-traffic-enabling Internet 135 access and web page downloads. In the embodiment in FIG. 1 the air interface standard is compatible with a code division multiple access (CDMA) air interface standard, such as CDMA2000, although the particular air interface standard used by the wireless communication system is not a limitation upon the practice of this invention.

The mobile terminal 150 typically includes a control unit or control logic, such as a microcontrol unit (MCU) 152 (a data processor) having an output coupled to an input of a display 156 and an input coupled to an output of an information entry system 158. The information entry system can comprise voice-activated information entry systems; touch-initiated information entry systems such as, for example, keyboards, keypads or touch screens; and combinations thereof. For example, a touch initiated information entry system can be combined with a voice-activated information entry system in various embodiments. A microphone 160 and a speaker 162 are typically provided for enabling a user to conduct voice calls in a conventional manner.

The mobile terminal 150 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by a user.

The MCU 152 is assumed to include or be coupled to some type of memory 154, including a non-volatile memory for storing an operating program and other information, as well as volatile memory for temporarily storing required data, scratchpad memory, received packet data, packet data to be transmitted, and the like. At least some of this temporary data can be stored in a data buffer 155. The operating system is assumed, for the purposes of this invention, to enable the MCU 152 to execute the software routines, layers and protocols required to implement the methods in accordance with this invention.

The mobile terminal 150 also contains a wireless section that includes a digital signal processor (DSP) 164, or equivalent high speed processor or logic, as well as a wireless transceiver 166 that includes a transmitter 168 and a receiver 170, both of which are coupled to an antenna 172 for communication with the network operator. At least one local oscillator, such as a frequency synthesizer (SYNTH) 174 is provided for tuning the transceiver. Data, such as digitized voice and packet data, is transmitted and received through antenna 172.

The preceding description concerned one possible environment in which a portable communications device capable of performing channel equalization operations in accordance with the present invention may operate. Now more detailed aspects of the invention will be presented.

Figure 2:
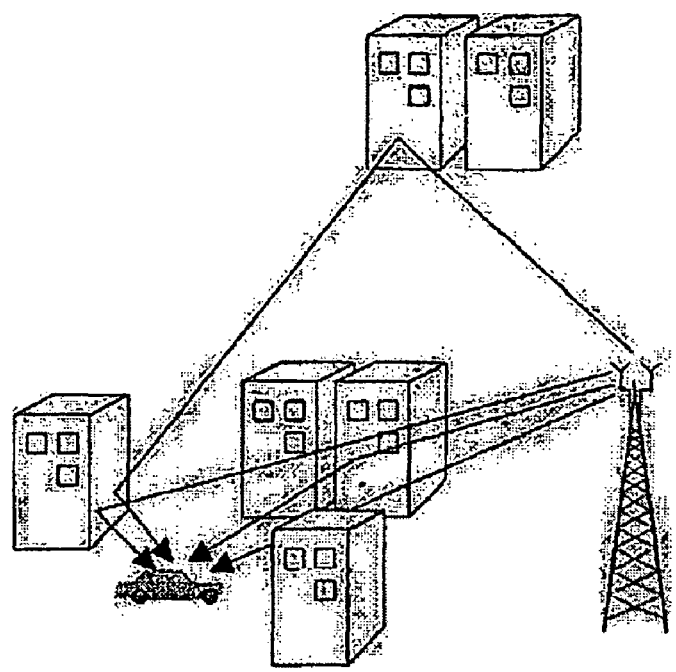
FIG. 2 depicts a typical scenario for a channel having a sparse impulse response-delay profile.

FIG. 2 depicts a typical communication scenario in which multipath interference may be experienced. In such a scenario there are significant differences in the lengths of paths various versions of a signal are traversing. In such a scenario, a sparse channel impulse response-delay profile often results.

Figure 3:
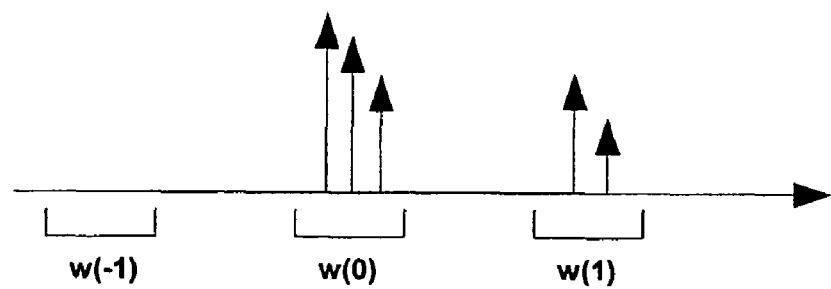
FIG. 3 depicts the channel impulse response-delay profile of the channel associated with the scenario depicted in FIG. 2, and positioning of filter windows in accordance with the invention.

FIG. 3 is a graph depicting a channel impulse response-delay profile of a sparse channel associated with an operating environment like that depicted in FIG. 2. As can be seen in FIG. 3, there are two clusters 310, 320 of closely-spaced channel taps. The clusters 310, 320 themselves are widely spaced. It is the wide delay spread in combination with the existence of intervening taps having insubstantial or zero energy that results in complexity and inefficiency. In an equalizer implementation comprising a finite impulse filter, an equalizer coefficient will be calculated for each sample inside a selected delay window covering the non-zero channel clusters and used in a multiplication operation. Multiplication operations are complex and time-consuming, and are particularly inefficient when associated with a zero or near-zero equalizer coefficient derived from intervening channel taps between clusters 310, 320.

In various methods of the present invention, filter windows 330, 340, and 350 are applied, and channel equalization coefficients are only calculated for channel taps associated with the filter windows. In one method in accordance with the present invention, at least two clusters of channel taps collectively having the greatest percentage of energy associated with a known signal are identified. If the clusters 310, 320 are widely spaced by a delay spread, this is indicative of a sparse channel. Then a filter window is selected for, and aligned with, the cluster 310 having the greatest percentage of energy associated with the known signal. Next, channel equalization coefficients are calculated using the channel taps associated with the filter window 330, and the resulting channel equalization coefficients are then used to perform channel equalization operations.

In another method operating in accordance with the invention, a second filter window is used in addition to the first filter window. The second filter window 340 is aligned with the second cluster of channel taps 320. The channel taps associated with the second filter window 320 are used to calculate equalization coefficients. The equalization coefficients associated with the first and second filter windows are then used to perform channel equalization operations.

In a further method operating in accordance with the present invention a third filter window 350 is used in combination with first and second filter windows 330, 340. As is apparent from FIG. 3, no energy associated with the known signal is encompassed by filter window 350. Instead, in situations where multipath interference is a problem, it is to be expected that a portion of energy associated with tap clusters 310, 320 are actually associated with delayed versions of earlier signals already received by the mobile terminal. Using a third filter window 350 corrects the equalization process for this interference.

Now a more detailed mathematical presentation of the prior art and methods in accordance with the invention will be presented. The methods described in greater detail concern the first and second cases discussed previously where either one or two clusters of channel taps are used to estimate channel equalization coefficients. In the first method, a truncated LMMSE filter, channel taps in the second cluster are treated as part of the noise, and only a short filter is used to equalize the first cluster of channel taps. The idea is that performance-wise, it may be sufficient to capture the majority of channel energy in the first cluster. In a second method, a so-called soft combining LMMSE filter, channel equalization coefficients are calculated for two clusters of channel taps collectively having the greatest percentage of energy as indicated by the channel impulse-delay profile. A third method, the so-called master-slave LMMSE filter, is similar to the soft combining LMMSE filter in that it also involves two short filters and a subsequent soft combining structure. However, in the master-slave structure, the equalization coefficients associated with the two channel clusters are jointly optimized.

At a base station, consider the situation where J active users are each assigned a number of codes $K_j$, for $j=1, \ldots, J$. Let $K=\Sigma_j K_j$ be the total number of active spreading codes. Note that in the present discussion, the spreading code index is used, rather than the user index, to simplify the notation. At the transmitter, the chip-level representation is given by:

$$d(i) = c(i) \sum_{k=1}^{K} \sum_{m} a_k b_k(m) s_k(i-mG) \quad (1)$$

where i, m and k are chip, symbol and spreading code indices. The base station scrambling code is denoted by $c_i$. Meanwhile, $a_k$ stands for the signal amplitude assigned to spreading code k, $b_k$ is the information symbol sequence for spreading code k and $s_k(i)$ is the spreading code k.

The two clusters of channel are denoted as $h^a=[h_0^a, \ldots, h_{L_a}^a]$ and $h^b=[h_0^b, \ldots, h_{L_b}^b]$, where $L_a$ and $L_b$ denote the length of the first and second cluster, respectively. The received chip sequence is the sum of two convolutions corrupted by additive white Gaussian noise:

$$r(i) = \sum_{l=0}^{L_a} h_l^a d(i-l) + \sum_{l=0}^{L_b} h_l^b d(i-l-L_a-L_g-1) + n(i) \quad (2)$$

where $L_g$ is the gap (in chips) between the first and second clusters, and $n(i) \sim N(0,\sigma^2)$ is the identical independent noise sequence. There are two ways of representing the signal in a matrix-vector form. First, following the usual treatment and let $\tilde{h}=[h_{1\times L_a}^a, 0_{1\times L_g}, h_{1\times L_b}^b]=[h_0, \ldots, h_L]$ be the overall chip-level channel impulse vector of size $L=L_a+1+L_g+L_b+1$. Next, let $r(i)=[r(i+F_1), \ldots, r(i-F_2)]$ be a received signal vector of size $F_1+F_2+1$, where $F_1$ and $F_2$ are two free variables such that $F_1, F_2 > L$. It is easily shown that $$r(i)=Hd(i)+n(i), \quad (3)$$

where $$H = \begin{bmatrix} h_0 & \cdots & h_L & & \\ & \ddots & & \ddots & \\ & & h_0 & \cdots & h_L \end{bmatrix}_{(F_1+F_2+1)\times(L+F_1+F_2+1)} \quad (4)$$

$$d(i) = [d(i+L+F_1), \ldots, d(i-F_2-L)]^T_{(L+F_1+F_2+1)\times 1} \quad (5)$$

The sizes of the matrices involved in (3) are fairly large since L is large (more than 95 in this case). Alternatively, one can write a compact version of signal model where the received signal vector is much shorter and is defined as $r_c(i)=[r(i+f_1), \ldots, r(i-f_2)]$, where the free variables $f_1, f_2 \ll L$. Accordingly, the signal model becomes $$r_c(i) = H^a d^a(i) + H^b d^b(i) + n(i), \quad (6)$$

$$H^a = H = \begin{bmatrix} h_0^a & \cdots & h_{L_a}^a & & \\ & \ddots & & \ddots & \\ & & h_0^a & \cdots & h_{L_a}^a \end{bmatrix}_{(f_1+f_2+1)\times(L_a+f_1+f_2+1)} \quad (7)$$

and $H^b$ is a similar Teoplitz matrix of size $(f_1+f_2+1)\times(L_b+f_1+f_2+1)$. Meanwhile, the transmit chip vectors $d^a(i)$ and $d^b(i)$ are given by $d^a(i)=[d(i+f_1), \ldots, d(i-f_2-L_a)]_{(f_1+f_2+L_a+1)\times 1}$, $d^b(i)=[d(i+f_1-L_a-L_g), \ldots, d(i-f_2-L)]_{(f_1+f_2+L_b+1)\times 1}$.

As is shown in the next section, the alternative signal model is useful in the discussion of the truncated and soft-combining LMMSE filtering structures.

Figure 4:
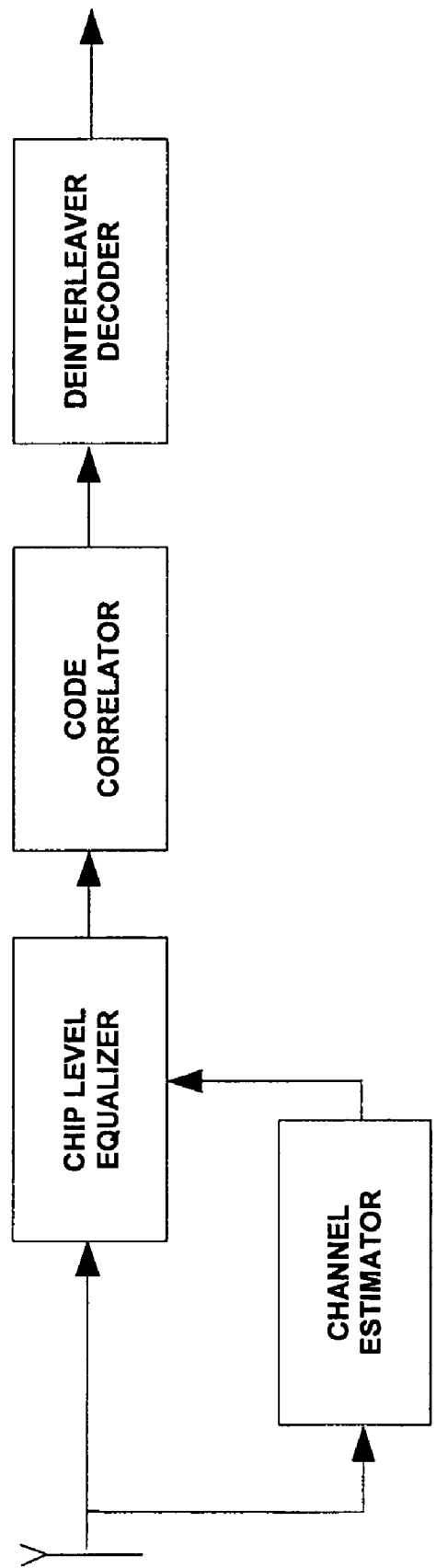
FIG. 4 depicts a block diagram of an aspect of a receiver operating in accordance with the invention.

The overall block diagram of the receiver with chip-level equalizer is shown in FIG. 4. The impulse response of the channel is estimated at block 410. Typically, one or two clusters of channel taps collectively having the greatest percentage of energy are identified and channel equalization filter coefficients are calculated. The channel equalization coefficients are then input to the chip level equalizer 420. After the chip-level equalizer 420, the orthogonality of the Walsh code is partially re-installed and the desired symbol is detected with a simple code correlator 430 which correlates to the desired spreading code. Note the descrambling process is also included in the code correlator. The output of the code correlator 430 is then input into a deinterleaver decoder 440. Generally these actions can be implemented in the digital signal processing block 164 of the mobile terminal 150 depicted in FIG. 1, although other arrangements in accordance with the present invention are possible.

The conventional chip-equalization in accordance with the prior art will now be described. The goal is to obtain the best MMSE estimate of the chip d(i) given the received vector r(i) which is defined in (3), i.e., $$\hat{d}(i)=E[d(i)|r(i)] \quad (8)$$

An additional constraint of linearity leads to a filter structure $\hat{d}(i)=w^H r(i)$ and the filter w is the solution to the LMMSE problem:

$$w^{opt} = \arg\min_{w} |d(i) - w^H r(i)|^2, \quad (9)$$

which is readily given by $$w^{opt}=E[r(i)r(i)^H]^{-1}E[r(i)d^*(i)]=\sigma_d^2 R^{-1} h \quad (10)$$

Note that $R=E[r(i)r(i)^H]$ is the signal correlation matrix and h is the column that is associated with d(i) in matrix H. The drawback of applying the conventional chip-equalization approach discussed above in a sparse multipath-channel is two-folded: first, the computational complexity is very high as a matrix of size $(F_1+F_2+1)\times(F_1+F_2+1)$ has to be inverted, and in the meantime have a filter of length $F_1+F_2+1$; second, if an adaptive version of the filter is used, the convergence will be very slow because too many parameters (filter weights) require simultaneous adaptation.

In order to overcome the limitations of the prior art, the present invention uses three distinct filter strategies that exploit the unique structure of the sparse channel of interest. The first method, the truncated LMMSE filter, treats the channel taps in the second cluster as part of the noise, and only uses a short filter to equalize the first cluster of channel taps. The idea is that performance wise, it may be sufficient to capture the majority of channel energy (85 percent) in the first cluster. The second method, the soft combining LMMSE filter, is comprises of two short filters each intended for equalization of one cluster of channel taps, followed by a soft maximum ration combiner (MRC). The idea of this approach is to combine the soft combing idea in RAKE estimator and the equalization idea in LMMSE estimator. Last but not least, the master-slave LMMSE filter is similar to the soft combining LMMSE filter in that it also involves two short filters and a subsequent soft combining structure. However, in the master-slave structure, it is assumed that the two filters are jointly optimized, and the combiner is a simple equal gain combiner (EGC). It is shown in the simulations that the master-slave method achieves the best performance among all the methods compared.

The truncated LMMSE filter will now be described. By lumping the second term in equation (6) into noise the following equation results:

$$r_c(i) = H^a d^a(i) + n'(i), \quad (11)$$

where $n'(i) = H^b d^b(i) + n(i)$. The best MMSE estimate of $\hat{d}(i)$ becomes $$\hat{d}(i) = E[d(i)|r_c(i)] \quad (12)$$

Furthermore, the LMMSE estimate of d(i) is given by $$\hat{d}(i) = w^H r_c(i) = \sigma_d^2 h^{a,H} R_c^{-1} r_c(i), \quad (13)$$

where $w = \sigma_d^2 R_c^{-1} h^a$, $R_c = E[r_c(i) r_c^H(i)]$ and $h^a$ is the column in $H^a$ that is associated with d(i). Note that compared with a conventional LMMSE approach, the complexity of the truncated LMMSE filter is much lower since it only needs to invert a matrix of size $(f_1+f_2+1) \times (f_1+f_2+1)$, and in the meantime have a filter of length $f_1+f_2+1$.

The soft combining filtering can be viewed as an extension of the truncated filtering approach discussed in the previous subsection. However, in this approach, two estimates of d(i) are generated, namely $\hat{d}^a(i)$ and $\hat{d}^b(i)$ and then combine them with an MRC. While the first estimate $\hat{d}^a(i)$ is generated exactly as described in the previous subsection, the generation of second estimate $\hat{d}^b(i)$ involves more work. A simple increment of the chip index in equation (6) results in $$r_c(i+L_a+L_g) = H^a d^a(i+L_a+L_g) + H^b d^b(i+L_a+L_g) + n(i+L_a+L_g), \quad (14)$$

where it is easy to see that $d(i) \in d^b(i+L_a+L_g)$. Therefore, if the first term is lumped in the above equation into the noise, similar to what was done in the previous section, the following equation results:

$$r_c(i+L_a+L_g) = H^b d^b(i+L_a+L_g) + n'(i+L_a+L_g), \quad (15)$$

where in this case $n'(i+L_a+L_g) = n(i+L_a+L_g) + H^a d^a(i+L_a+L_g)$. The second MMSE estimate $\hat{d}^b(i)$ is thus given by $$\hat{d}^b(i) = E[d(i)|r_c(i+L_a+L_g)], \quad (16)$$

which is given by the following equation if the linearity constraint is added:

$$\hat{d}^b(i) = w^{b,H} r_c(i+L_a+L_g) = \sigma_d^2 h^{b,H} R_c^{-1} r_c(i+La+Lg), \quad (17)$$

where $w^b = \sigma_d^2 R_c^{-1} h^b$ and $h^b$ is the column in $H^b$ that is associated with d(i). For completion, the first estimate $\hat{d}^a(i)$ is written in the following equation:

$$\hat{d}^a(i) w^{a,H} r_c(i) = \sigma_d^2 h^{a,H} R_c^{-1} r_c(i) \quad (18)$$

Once the two estimates $\hat{d}^a(i)$ and $\hat{d}^b(i)$ are available, the combined soft chip output is given by $$\hat{d}(i) = \gamma^a \hat{d}^a(i) + \gamma^b \hat{d}^b(i) \quad (19)$$

where $\gamma^a$, $\gamma^b$ are the SNRs for the two estimates. Once the channel taps and correlation matrix are known, these SNRs can easily be computed. For example, the first SNR $\gamma^a$ is $$\gamma^a = \frac{\sigma_d^2 h^{a,H} R_T^{-1} h^a}{1 - \sigma_d^2 h^{a,H} R_T^{-1} h^a} \quad (20)$$

Figure 5:
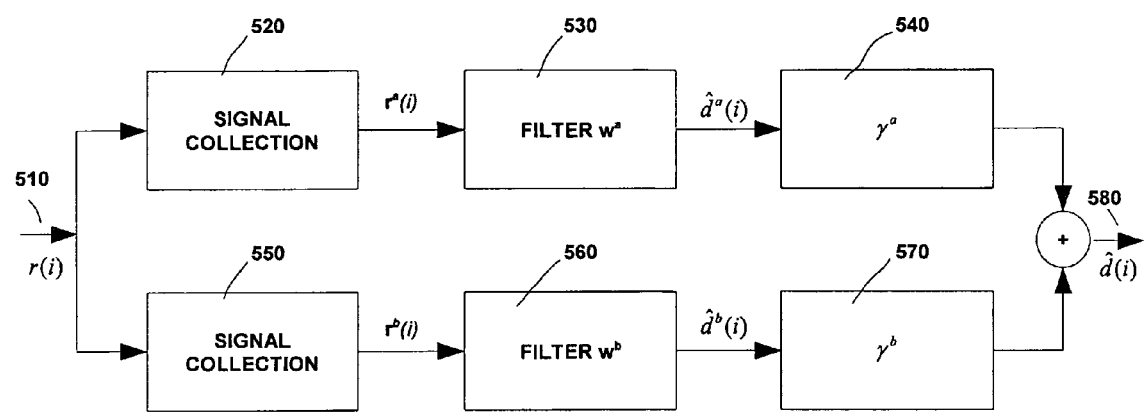
FIG. 5 depicts a block diagram of a linear equalizer filter operating in accordance with an embodiment of the invention.

A block diagram of the soft combining LMMSE filter structure is shown in FIG. 5. Two sequences of signal vectors are generated from the sequence of received chips; these two vectors are filtered by the two LMMSE filters and the outputs are soft-combined using an MRC combiner. The known signal r(i) is input at 510. As depicted in FIG. 3, a tap or cluster of closely-spaced channel taps are identified as having the greatest percentage of energy associated with a chip from a known signal. After application of a first and a second filter window, tap values for channel taps associated with the two filter windows are respectively collected at 520 and 550. Equalization coefficient values are calculated and then applied at 530 and 560. The SNRs associated with the two chip estimates are then applied to the outputs (chip estimates) of filters 530 and 560. Then, the two chip estimates are combined at 580.

In the soft-combining LMMSE filter, an effort was made to take advantage of the sparse channel structure with a two-filter MRC approach. In this section, it is shown that this two-filter approach can be further improved by jointly optimizing these filter weights. To facilitate the discussions in this section, the signal model of (6) and (14) since $d^a(i)$ and $d^b(i+L_a+L_g)$ overlap and it is difficult to combine them in a matrix-vector form. Instead, the solution will be developed from the more general signal model of equation (3).

Two sub-vectors of the received vector r(i) are defined as $r^m(i)$ and $r^s(i)$, where superscripts m and s stand for master and slave, respectively. For clarity, it is assumed that both vectors are of length 2g+1, and that both are centered around the first tap in their respective channel clusters:

$$r^m(i) = [r(i+g), \ldots, r(i-g)]^T,$$

$$r^s(i) = [r(i+L_a+L_g), \ldots, r(i+L_a+L_g-g)]^T \quad (21)$$

Figure 6:
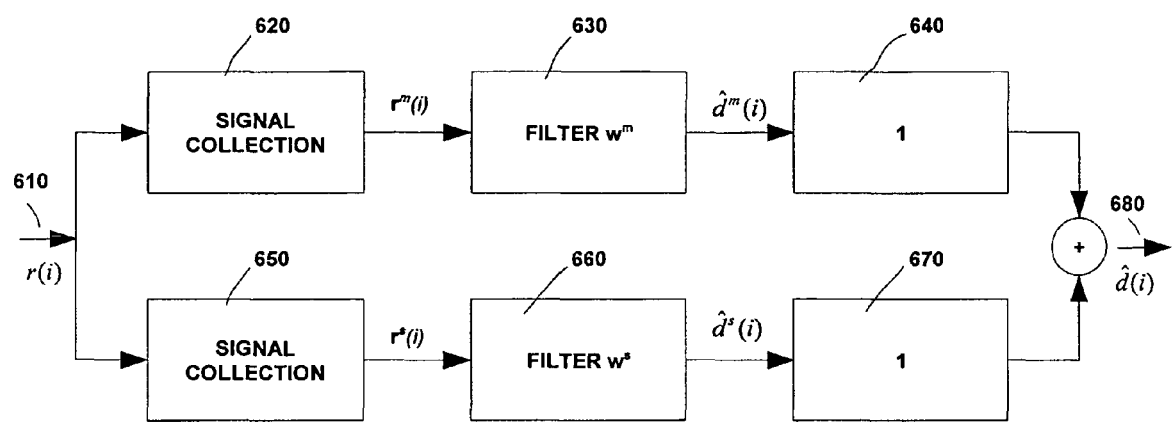
FIG. 6 depicts a block diagram of a linear equalizer filter operating in accordance with another embodiment of the invention.

Note that g is chosen such that $g \ll \min(F_1, F_2)$ and such that $r^m(i)$ and $r^s(i)$ are strictly subvectors of r(i). Now let $\tilde{r}(i) \doteq [r^m(i); r^s(i)]$ and the following results:

$$\tilde{r}(i) \doteq \begin{bmatrix} r^m(i) \\ r^s(i) \end{bmatrix} = \begin{bmatrix} H^m \\ H^s \end{bmatrix} d(i) + \tilde{n}(i), \quad (22)$$

where $H^m$ and $H^s$ are the corresponding sub-matrices of H. The MMSE estimate of $\hat{d}(i)$ is thus given by $$\hat{d}(i) = E[d(i)|\tilde{r}(i)], \quad (23)$$

which is given by the following equation if linearity constraint is added:

$$\hat{d}(i) = w^{m,H} r^m(i) + w^{s,H} r^s(i), \quad (24)$$

where $$w \doteq \begin{bmatrix} w^m \\ w^s \end{bmatrix} = \sigma_d^2 \begin{bmatrix} R^{mm} & R^{ms} \\ R^{sm} & R^{ss} \end{bmatrix}^{-1} \begin{bmatrix} h^m \\ h^s \end{bmatrix}$$

is the concatenated filter weight vector of size 2(2g+1). Note that in the above equation, $R^m = E[r^m(i) r^{m,H}(i)]$ and $h^m$, $h^s$ are the columns in H$^m$ and H$^s$ that are associated with d(i). Similar to FIG. 5, a block diagram of the Master-Slave filtering structure is shown in FIG. 6. Note that in this case the soft combining MRC reduces to an Equal Gain Combiner (EGC).

Similar to the block diagram of FIG. 5, in FIG. 6 two sequences of signal vectors are generated from the sequence of received chips. These two vectors are then filtered by the two LMMSE filters and the outputs are soft-combined using an MRC combiner which reduces to an EGC combiner. The known signal r(i) is input at 610. As depicted in FIG. 3, a tap or cluster of closely-spaced channel taps are identified as having the greatest percentage of energy associated with a chip from a known signal. After application of a first and a second filter window, tap values for channel taps associated with the two filter windows are respectively collected at 620 and 650. Equalization coefficient values are calculated and then applied at 630 and 660. In contrast to the method depicted in FIG. 5, in the method of the block diagram depicted in FIG. 6 the equalization coefficients calculated for the two filter windows are jointly optimized. Chip estimates (outputs of filters 630 and 660) are then combined in an equal-gain combination at 640, 670 and 680.

Figure 7:
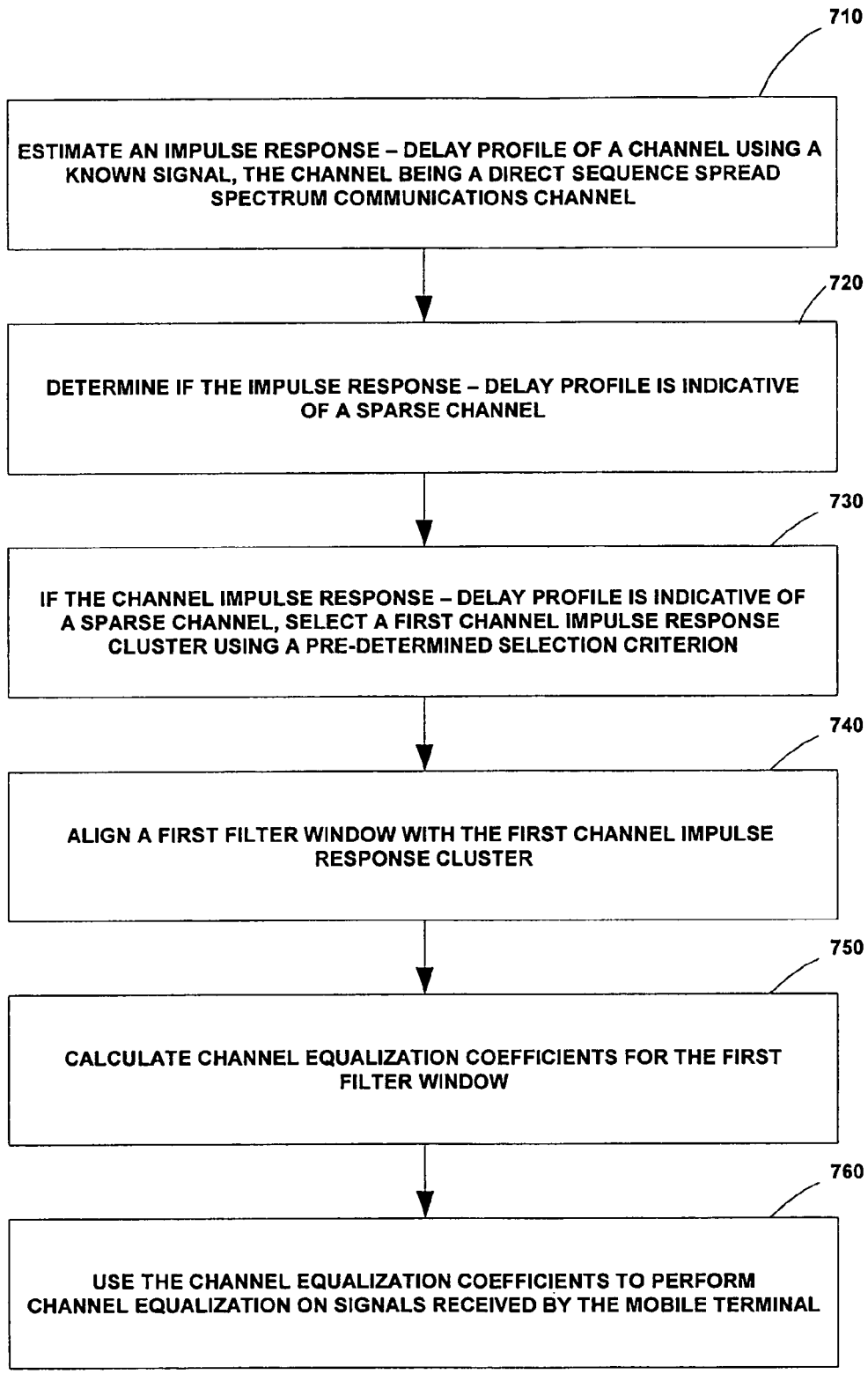
FIG. 7 is a flow chart depicting a method operating in accordance with the present invention.

Methods operating in accordance with the present invention are summarized in FIGS. 7 and 8. In the method of FIG. 7, the impulse response of a direct sequence spread spectrum communication channel is estimated at step 710 using a known signal. The known signal may be a pilot signal typically incorporated in Walsh coded signals in CDMA systems. Then, at step 720, it is determined if the impulse response of the channel is indicative of a sparse channel. Next, at step 730, if it is determined that the channel impulse response is indicative of a sparse channel, at least a first channel impulse response cluster is selected using a pre-determined criterion. The pre-determined criterion may comprise simply selecting the channel impulse response cluster having the greatest percentage of energy. More complex criteria may be applied. For example, it may be determined that in certain circumstances channel equalization coefficients associated with just a single channel impulse response cluster need be calculated for ease of computation, etc. In other circumstances, the criteria may be that a cut-off is applied to a second channel impulse response cluster. Ordinarily, channel equalization coefficients would be calculated for the second channel impulse response, but if the percentage of energy represented by the channel impulse response cluster falls below the cut-off, then channel equalization coefficients are no longer calculated for the second channel impulse response cluster.

Then, at step 740, a first filter window is aligned with the first channel impulse response cluster. Next, at step 750, channel equalization coefficients are calculated for the first filter window. Then, at step 760, the channel equalization coefficients are used to perform channel equalization of signals received by the mobile terminal.

In one variant of the method depicted in FIG. 7, the channel equalization coefficients are calculated using a linear minimum mean square error criterion. In another variant of the method depicted in FIG. 7, the first filter window is wider than the first channel impulse response cluster in terms of the delay difference reflected in the first channel impulse response cluster. In a further variant of the method depicted in FIG. 7, prior to aligning the first filter window with the first channel impulse response cluster, the width of the first filter window is calculated based on relative delays associated with impulse response components comprising the first channel impulse response cluster.

In yet another variant of the method depicted in FIG. 7, when the first filter window is aligned with the first channel impulse response cluster, the first filter window is positioned so that the first channel impulse response cluster is displaced towards the rightmost portion of the first filter window in order to reduce interpath interference effects between channel impulse response components comprising the first channel impulse response cluster when the channel equalization coefficients associated with the first filter window are calculated.

Another embodiment of the method of the present invention is depicted in FIG. 8. At step 810, the impulse response-delay profile of a channel is estimated by signal processing components of a mobile terminal using a known signal. The channel comprises a direct sequence spread spectrum channel. Then, at step 820, it is determined if the impulse response-delay profile is indicative of sparse channel. Next, at step 830, if it is determined that the impulse response-delay profile is indicative of a sparse channel, at least first and second channel impulse response clusters are selected using a pre-determined selection criterion. It is assumed that the first and second channel impulse response clusters are separated by a delay difference indicative of the sparse nature of the channel. In one possible variant, the pre-determined criterion may be to select the channel clusters having the greatest, and second-greatest percentage of energy. Other selection criteria may be used.

Then, at step 840, a first filter window is aligned with the first channel impulse response cluster and a second filter window is aligned with the second channel impulse response cluster. Next, at step 850, channel equalization coefficients are calculated for the first and second filter windows. Then, at step 860, the channel equalization coefficients calculated for the first and second filter windows are used to perform channel equalization on signals received by the mobile terminal.

In one variant of the method depicted in FIG. 8, the channel equalization coefficients associated with the first and second filter windows are calculated using a linear minimum mean square error criterion. In another variant of the method depicted in FIG. 8, prior to aligning the first and second filter windows with their respective channel impulse response clusters, the widths of the first and second filter windows are calculated based on the relative delays associated with impulse response components comprising each of the first and second channel impulse response clusters. In a further variant of the method depicted in FIG. 8, while calculating the channel equalization coefficients for the first and second filter windows, the channel equalization coefficients associated with the first and second filter windows are jointly optimized using a linear minimum mean square error criterion.

In yet another variant of the method depicted in FIG. 8, when the first and second filter windows are aligned with their respective first and second channel impulse response clusters, they are aligned so that each of the channel impulse response clusters is displaced towards the rightmost portion of its respective filter window. This reduces interpath interference effects between channel impulse response components comprising the first and second channel impulse response clusters when the channel equalization coefficients associated with the first and second filter windows are calculated.

In a still further variant of the method depicted in FIG. 8, additional steps are performed. The further steps comprise: positioning a third filter window with respect to the first and second filter windows, where the third filter window is positioned to the leftmost one of the first and second filter windows; calculating channel equalization coefficients for the third filter window; and using the channel equalization coefficients associated with the third filter window to perform channel equalization operations on signals received by the mobile terminal. In yet another variant of the method depicted in FIG. 8, when the channel equalization coefficients associated with the first, second and third filter windows are calculated, the channel equalization coefficients are jointly optimized using a linear minimum mean square error criterion.

Thus it is seen that the foregoing description has provided by way of exemplary and non-limiting examples a full and informative description of the best methods and apparatus presently contemplated by the inventors for implementing a split equalizer for sparse channels. One skilled in the art will appreciate that the various embodiments described herein can be practiced individually; in combination with one or more other embodiments described herein; or in combination with equalizers differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. An apparatus, comprising at least one processor; and at least one memory including computer program code, the at least one memory and the computer program code configured to, with the at least one processor, cause the apparatus to perform at least the following:
   estimating an impulse response-delay profile of a channel using a known signal, the channel being a direct sequence spread spectrum communications channel;
   determining if the impulse response-delay profile is indicative of a sparse channel;
   if the channel impulse response-delay profile is indicative of a sparse channel, selecting a first channel impulse response cluster using a pre-determined selection criterion, wherein the first channel impulse response cluster is separated from other channel impulse response clusters by a delay difference indicative of the sparse nature of the channel;
   aligning a first filter window with the first channel impulse response cluster;
   calculating channel equalization coefficients for the first filter window; and
   using the channel equalization coefficients to perform channel equalization.

2. The apparatus of claim 1, wherein the pre-determined criterion comprises selecting a channel impulse response cluster as the first channel impulse response cluster in dependence on which channel impulse response cluster has a greatest percentage of energy associated with the desired signal as indicated by the channel impulse response-delay profile.

3. The apparatus of claim 1, where the channel equalization coefficients are calculated using a linear minimum mean square error criterion.

4. The apparatus of claim 1, wherein the first filter window is wider than the first channel impulse response cluster in terms of the delay difference reflected in the first channel impulse response cluster.

5. The apparatus of claim 1, the computer program code configured to, with the at least one processor and the memory, further cause the apparatus to perform at least the following:
   prior to aligning the first filter window with the first channel impulse response cluster, calculating a width of the first filter window based on relative delays associated with impulse response components comprising the first channel impulse response cluster.

6. The apparatus of claim 1, wherein when the first filter window is aligned with the first channel impulse response cluster, the first filter window is positioned so that the first channel impulse response cluster is displaced towards the rightmost portion of the first filter window in order to reduce interpath interference effects between channel impulse response components comprising the first channel impulse response cluster when the channel equalization coefficients associated with the first filter window are calculated.

7. The apparatus of claim 1, the computer program code configured to, with the at least one processor and the memory, further cause the apparatus to perform at least the following:
   selecting a second channel impulse response cluster using the pre-determined selection criterion, wherein the second channel impulse response cluster is separated from the first channel impulse response cluster by a delay difference indicative of the sparse nature of the channel;
   aligning a second filter window with the second channel impulse response cluster;
   calculating channel equalization coefficients for the second filter window; and
   using the channel equalization coefficients associated the second filter window to perform channel equalization.

8. The apparatus of claim 7, wherein the pre-determined criterion comprises selecting a channel impulse response cluster as the second channel impulse response cluster in dependence on which channel impulse response cluster has a second-greatest percentage of energy associated with the known signal as indicated by the channel impulse response-delay profile.

9. The apparatus of claim 7, the computer program code configured to, with the at least one processor and the memory, further cause the apparatus to perform at least the following:
   while calculating channel equalization coefficients for the first and second filter windows, jointly optimizing the channel equalization coefficients associated with the first and second filter windows.

10. The apparatus of claim 7, the computer program code configured to, with the at least one processor and the memory, further cause the apparatus to perform at least the following:
   positioning a third filter window with respect to the first and second filter windows, wherein only one of the first or second filter windows is leftmost and whereby the third filter window is positioned to the left of the leftmost one of the first or second filter windows;
   calculating channel equalization coefficients for the third filter window; and
   using the channel equalization coefficients associated with the third filter window to perform channel equalization operations on signals received by a mobile terminal.

11. The apparatus of claim 7, where the channel equalization coefficients are used for performing chip level equalization, and wherein using the channel equalization coefficients associated with the first filter window result in a first chip estimate and using the channel equalization coefficients associated with the second filter window result in a second chip estimate, the operations further comprising:
   combining the chip estimates using a maximum ratio combining method.

12. The apparatus of claim 1, where the apparatus is embodied in a mobile terminal.

13. The apparatus of claim 1, where the apparatus is embodied in a signal processing component.

14. A method comprising:
   estimating an impulse response-delay profile of a channel using a known signal, the channel being a direct sequence spread spectrum communications channel;
   determining if the impulse response-delay profile is indicative of a sparse channel;

if the channel impulse response-delay profile is indicative of a sparse channel, selecting a first channel impulse response cluster using a pre-determined selection criterion, wherein the first channel impulse response cluster is separated from other channel impulse response clusters by a delay difference indicative of the sparse nature of the channel;

aligning a first filter window with the first channel impulse response cluster;

calculating channel equalization coefficients for the first filter window; and using the channel equalization coefficients to perform channel equalization.

15. The method of claim 14, wherein the pre-determined criterion comprises selecting a channel impulse response cluster as the first channel impulse response cluster in dependence on which channel impulse response cluster has a greatest percentage of energy associated with the desired signal as indicated by the channel impulse response-delay profile.

16. The method of claim 14, where the channel equalization coefficients are calculated using a linear minimum mean square error criterion.

17. The method of claim 14, wherein the first filter window is wider than the first channel impulse response cluster in terms of the delay difference reflected in the first channel impulse response cluster.

18. The method of claim 14, further comprising:
prior to aligning the first filter window with the first channel impulse response cluster, calculating a width of the first filter window based on relative delays associated with impulse response components comprising the first channel impulse response cluster.

19. The method of claim 14, wherein when the first filter window is aligned with the first channel impulse response cluster, the first filter window is positioned so that the first channel impulse response cluster is displaced towards the rightmost portion of the first filter window in order to reduce interpath interference effects between channel impulse response components comprising the first channel impulse response cluster when the channel equalization coefficients associated with the first filter window are calculated.

20. The method of claim 14, further comprising:
selecting a second channel impulse response cluster using the pre-determined selection criterion, wherein the second channel impulse response cluster is separated from the first channel impulse response cluster by a delay difference indicative of the sparse nature of the channel;
aligning a second filter window with the second channel impulse response cluster;
calculating channel equalization coefficients for the second filter window; and
using the channel equalization coefficients associated the second filter window to perform channel equalization.

21. A computer readable memory tangibly encoded with a computer program executable by a processor to perform actions comprising:
estimating an impulse response-delay profile of a channel using a known signal, the channel being a direct sequence spread spectrum communications channel;
determining if the impulse response-delay profile is indicative of a sparse channel;
if the channel impulse response-delay profile is indicative of a sparse channel, selecting a first channel impulse response cluster using a pre-determined selection criterion, wherein the first channel impulse response cluster is separated from other channel impulse response clusters by a delay difference indicative of the sparse nature of the channel;
aligning a first filter window with the first channel impulse response cluster;
calculating channel equalization coefficients for the first filter window; and
using the channel equalization coefficients to perform channel equalization.

22. The computer readable memory of claim 21, wherein the pre-determined criterion comprises selecting a channel impulse response cluster as the first channel impulse response cluster in dependence on which channel impulse response cluster has a greatest percentage of energy associated with the desired signal as indicated by the channel impulse response-delay profile.

23. The computer readable memory of claim 21, wherein when the first filter window is aligned with the first channel impulse response cluster, the first filter window is positioned so that the first channel impulse response cluster is displaced towards the rightmost portion of the first filter window in order to reduce interpath interference effects between channel impulse response components comprising the first channel impulse response cluster when the channel equalization coefficients associated with the first filter window are calculated.

24. The computer readable memory of claim 21, where the actions further comprise:
selecting a second channel impulse response cluster using the pre-determined selection criterion, wherein the second channel impulse response cluster is separated from the first channel impulse response cluster by a delay difference indicative of the sparse nature of the channel;
aligning a second filter window with the second channel impulse response cluster;
calculating channel equalization coefficients for the second filter window; and
using the channel equalization coefficients associated the second filter window to perform channel equalization.

* * * * *